United States Patent [19]

Kanno

[11] Patent Number: 4,651,245
[45] Date of Patent: Mar. 17, 1987

[54] DEFLECTION LIMITED MAGNETIC HEAD SUPPORTING STRUCTURE

[75] Inventor: Tetuo Kanno, Ebina, Japan

[73] Assignee: Ricoh Company, Ltd., Tokyo, Japan

[21] Appl. No.: 632,401

[22] Filed: Jul. 19, 1984

[51] Int. Cl.[4] .......................... G11B 5/58; G11B 21/20
[52] U.S. Cl. ..................................... 360/105; 360/104
[58] Field of Search ........................ 360/104, 105, 103

[56] References Cited

U.S. PATENT DOCUMENTS 4,167,766  9/1979  Chau .................................... 360/105
4,379,315  4/1983  Schuler ............................... 360/105

Primary Examiner—Robert S. Tupper
Attorney, Agent, or Firm—Cooper, Dunham, Griffin & Moran

[57] ABSTRACT

A magnetic head supporting structure includes a stationary base, a movable arm which has its base end pivoted to the base and a spring for biasing the movable arm thereby allowing a free end of the arm to be moved closer to or separated away from the base. The base is provided with a first magnetic head mounting section for mounting a first magnetic head and the arm is also provided with a second magnetic head mounting section for mounting a second magnetic head at its free end. The first magnetic head mounting section is provided with a support surface generally rectangular in shape for supporting thereon a gimbal spring having fixedly mounted thereon the first magnetic head and a deflection limiting surface defined inwardly of the support surface. The gimbal spring comes into contact with the deflection limiting surface when deflected beyond a predetermined amount thereby preventing the gimbal spring from deflecting excessively.

12 Claims, 7 Drawing Figures

DEFLECTION LIMITED MAGNETIC HEAD SUPPORTING STRUCTURE

BACKGROUND OF THE INVENTION

1. Field of the Invention

This invention generally relates to a magnetic recording and reproducing device and particularly to a floppy disc device for use with a double-sided floppy disc. More specifically, the present invention relates to a structure for supporting a magnetic head such that the head can follow the movement of a flexible floppy disc properly.

2. Description of the Prior Art

Prior art double magnetic head supporting structures may be generally categorized into four groups as follows:

(1) Cantilevered system

In this system, both of magnetic heads are mounted at the free ends of respective cantilevered leaf springs as disclosed in Japanese Patent Publication No. 56-6058 published for the purpose of oppositions, so that the magnetic heads follow the movement of a floppy disc quite well, but there are such disadvantages as easiness in off-tracking and difficulty in assemblage.

(2) One side magnetic head fixed system

As disclosed in Japanese Patent Laid-open Publication No. 54-34221, one of paired magnetic heads is fixedly provided with the other magnetic head mounted at the free end of a movable arm through a gimbal spring and the fixedly provided head is so positioned to slightly lift the floppy disc with the movable head pressed against the fixedly provided head with the floppy disc sandwiched therebetween. This system is easy to assemble and off-tracking does not take place easily. However, the heads do not follow the movement of floppy disc as much as desired. If the heads are made larger in weight so as to allow the heads to follow the movement of the floppy disc more closely, a load against the floppy disc increases which would then cause an increased wear.

(3) Gimbal spring one point pivot supporting system

As disclosed in Japanese Patent Laid-open Publication No. 54-133312, both of magnetic heads are mounted at the center of respective gimbal springs, each of which is supported by a pivot in point contact with the back surface of gimbal spring at the center thereof. In this system, the heads follow the movement of the floppy disc closely and easiness resides in assemblage. However, off-tracking takes place relatively easily, so that this system is not applicable for a disc of high density, which has an increased number of tracks per unit size.

(4) Gimbal spring two point pivot supporting system

As disclosed in Japanese Patent Laid-open Publication No. 57-167164, this is the system in which both of magnetic heads are mounted on respective gimbal springs at the center thereof with one of the gimbal springs being supported by a single pivot, which is in point contact with and at the center of the back side surface of the corresponding gimbal spring, and the other gimbal spring being supported by a double pivot, which is in point contact with and at the center of the corresponding gimbal spring. In this system, off-tracking is less likely to occur, but the heads do not follow the movement of the floppy disc as much as desired because the degree of freedom for the heads is rather limited.

SUMMARY OF THE INVENTION

It is therefore a primary object of the present invention to obviate the disadvantages of the prior art as described above and to provide an improved structure for supporting a magnetic head.

Another object of the present invention is to provide an improved magnetic head supporting structure which allows a magnetic head to follow the movement of a floppy disc very closely.

A further object of the present invention is to provide an improved magnetic head supporting structure which is easy in assemblage and less likely to cause off-tracking and wear of floppy disc.

Other objects, advantages and novel features of the present invention will become apparent from the following detailed description of the invention when considered in conjunction with the accompanying drawings.

DESCRIPTION OF THE PREFERRED EMBODIMENTS

Figure 1:
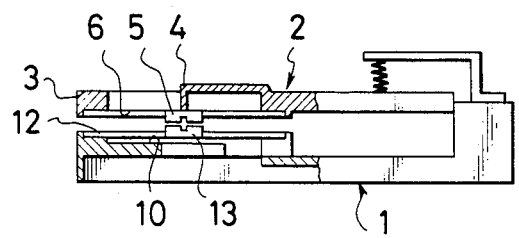
FIG. 1 is a partially cut-away, side elevational view showing the magnetic head supporting structure constructed in accordance with one embodiment of the present invention.

Referring now to FIGS. 1 through 4, there is shown a magnetic head supporting structure constructed in accordance with one embodiment of the present invention. As shown in FIG. 1, the magnetic head supporting structure includes a fixedly provided base 1 and a movable arm 2 which has its base end pivotted to the base 1 and is biased toward the base 1 by means of a spring. The arm 2 has a rectangular frame 3 at its free end and a pivot 4 located at the center of the frame 3. A gimbal spring 6 is mounted on the movable arm 2 as fitted into the frame 3 and an upper magnetic head 5 is fixedly mounted on the bottom surface of the gimbal spring 6 with a tip end of the pivot 4 in point contact with the top surface of the gimbal spring 6 at the center thereof.

Figure 2:
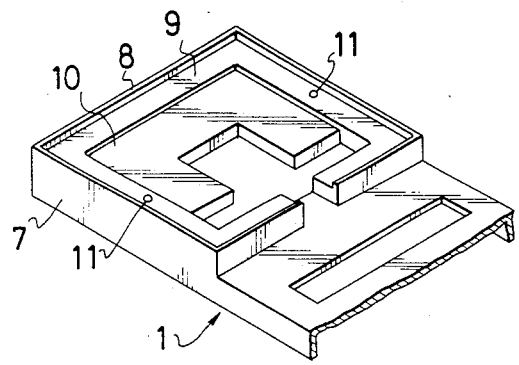
FIG. 2 is a perspective view showing a fixedly provided base of the magnetic head supporting structure shown in FIG. 1.
Figure 3:
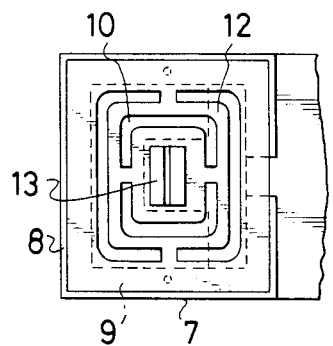
FIG. 3 is a partial plan view showing part of the fixed base, having a gimbal spring mounted thereon, of the structure shown in FIG. 1.
Figure 4:
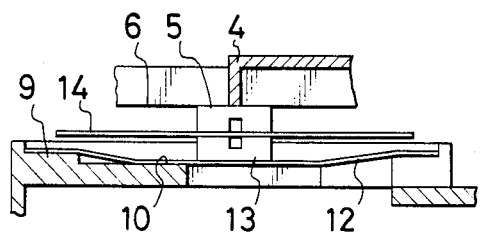
FIG. 4 is a fragmentary, cross-sectional view showing the magnetic head supporting structure of FIG. 1 when in use.

As best shown in FIG. 2, the stationary base 1 is provided with a rectangular frame section 7 whose top end portion defines a peripheral wall 8 defining a space for mounting a gimbal spring therein. A spring support section 9 is provided along the inner side of the peripheral wall 8 as extending inwardly over a predetermined length. Thus, the spring support section 9 is generally rectangular and C-shaped and has its top surface located at a position below the top end of the peripheral wall 8. Also provided in the stationary base 1 as extending along the inner side of the spring support section 9 is a spring deflection limiting section 10 whose top surface is located below the top surface of the spring support section 9 over a predetermined distance. In the illustrated embodiment, the spring deflection limiting section 10 is generally C-shaped. A pair of pins 11, 11 is provided as planted in the top surface of the spring support section 9 one on each of the opposed portions of the spring support section 9. As best shown in FIG. 3, a gimbal spring 12 rectangular in shape is mounted on the base 1 as fitted into the space defined by the peripheral wall 8 with its peripheral portion riding on the top surface of spring support section 9. A lower magnetic head 13 is fixedly mounted at the center of the gimbal spring 12 so that the lower magnetic head 13 is located opposite to the upper magnetic head 5 supported by the movable arm 2 through the gimbal spring 6.

With this structure, when a floppy disc 14 is placed in position with the upper magnetic head 5 being pressed against the lower magnetic head 13, the lower gimbal spring 12 having the lower magnetic head 13 mounted thereon becomes deflected. However, the amount of such a deflection is limited because the gimbal spring comes into surface contact with the top surface of the spring deflection limiting section 10. Thus, in the preferred embodiment, by structuring such that the gimbal spring 12 is in contact with the top surface of spring deflection limiting section 10 under the condition that the floppy disc 14 is flat and straight and the top surface of the spring support surface 9 is located approximately 0.3 mm above the top surface of the spring deflection limiting section 10, it is possible to have the lower magnetic head 13 follow the movement of the floppy disc 14 without application of undue load.

It is to be noted that the height of each of the top surfaces of spring support and spring deflection limiting sections 9 and 10 may be set appropriately depending on particular use conditions thereby allowing for the magnetic heads to follow the movement of floppy disc extremely closely. For example, if it is so structured that the top surface of lower magnetic head 13 is located above the bottom surface of floppy disc 14 which is flat and straight by approximately 0.5 mm when the gimbal spring 12 is undeflected and by approximately 0.2 mm when the gimbal spring 12 is deflected to be in surface contact with the top surface of spring deflection limiting section 10, the heads 5 and 13 can properly follow the movement of floppy disc 14 up to approximately 1 mm in the vertical direction.

In the case of a high density floppy disc having an increased number of tracks per unit size, e.g., 96 t.p.i., the track width is 160 microns and the track pitch is in the order of 265 microns, so that the allowable off-track tolerance is ±50 microns or less. Accordingly, in consideration of contributions for off-tracking from other parts of device, it is virtually not allowed to have any significant off-track error at the magnetic head supporting section. In accordance with the above-described embodiment of the present invention, under normal conditions, since the gimbal spring 12 is limited in deflection through surface contact with the spring deflection limiting section 10, off-track is not produced. It is to be noted that a load for pressing the lower magnetic head 13 against the spring deflection limiting section 10 from the surface of spring support section 9 is in the order of a few grams, but a weight of upper magnetic head 5 is 10 grams plus a few grams.

From a manufacturing viewpoint, the spring support and spring deflection limiting sections 9 and 10 are integrally formed in the stationary base 1 and it is only necessary to have the gimbal spring 12 snugly fitted into the space defined by the peripheral wall 8, assemblage is quite simple and the number of parts is minimized.

Figure 5:
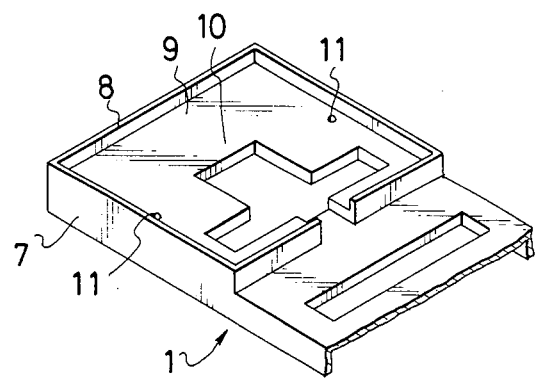
FIG. 5 is a perspective view showing the structure of a fixedly provided base of magnetic head supporting structure constructed in accordance with another embodiment of the present invention.
Figure 6:
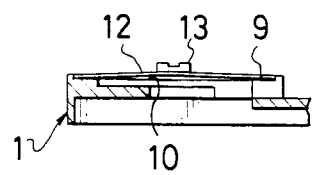
FIG. 6 is a fragmentary, cross-sectional view showing the base of FIG. 5 having mounted thereon a gimbal spring.
Figure 7:
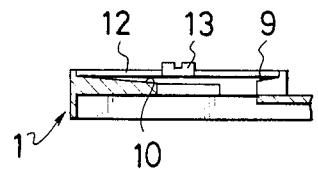
FIG. 7 is a fragmentary, cross-sectional view showing the base, having mounted thereon a gimbal spring, constructed in accordance with a further embodiment of the present invention.

Another embodiment of the present invention is illustrated in FIGS. 5 and 6. In this embodiment, the spring support and spring deflection limiting sections 9 and 10 are so formed have coplanar top surfaces. In this case, however, the lower gimbal spring 12 to be fitted into the space defined by the peripheral wall 8 is warped such that it is not in contact with the top surface of spring limiting section 10 while a load is not applied. FIG. 7 shows a further embodiment in which a continuous top surface sloping down toward the center from the peripheral wall 8 is defined by the top surfaces of spring support and spring deflection limiting sections 9 and 10. Such a sloping down top surface may be either straight or curved. In the embodiment of FIG. 7, the gimbal spring 12 carrying thereon the lower magnetic head 13 may be flat and straight.

As described above, in accordance with the present invention, there is provided a magnetic head supporting structure whose stationary base is provided with a spring deflection limiting section which limits the deflection of a gimbal spring by establishing a surface contact therewith, so that the magnetic head can follow the movement, in particular up and down wobbling, of floppy disc extremely closely and there is produced virtually no off-track errors. Thus, the present invention can be advantageously applied to a high density floppy disc having an increased number of tracks per unit length. Besides, the present invention is extremely easy to manufacture and wear due to friction is minimized since the load applied to the floppy disc is very low.

While the above provides a full and complete disclosure of the preferred embodiments of the present invention, various modifications, alternate constructions and equivalents may be employed without departing from the spirit and scope of the invention. Therefore, the above description and illustration should not be construed as limiting the scope of the invention, which is defined by the appended claims.

What is claimed is:

1. Apparatus for supporting a pair of magnetic heads to be in contact with opposite sides of a flexible recording medium, said apparatus comprising:
 a stationary base provided with a head mounting section which includes a first surface and a second surface which is located below said first surface;
 a deflectable member having mounted thereon a first magnetic head to be in contact with a first side of said recording medium, said deflectable member being supported on said first surface of said head mounting section when not deflected;
 a movable arm having a base end thereof pivotally supported to said base thereby allowing a free end thereof to move closer to or separated from said first magnetic head, said movable arm including a second magnetic head provided at said free end thereof to be in contact with a second side of said recording medium, said second side being an opposite side of said first side; and biasing means for biasing said movable arm to move said second magnetic head closer to said first magnetic head thereby holding said flexible recording medium in contact therebetween, whereby said deflectable member comes into contact with said second surface when said deflectable member is deflected thereby preventing said deflectable member from deflecting beyond a predetermined amount.

2. The apparatus of claim 1 wherein said deflectable member is a gimbal spring.

3. The apparatus of claim 2 wherein said first surface is generally rectangular and said second surface is also generally rectangular and located inside of said first surface.

4. The apparatus of claim 3 wherein said mounting section further includes a peripheral wall provided along the periphery of said generally rectangular first surface and said gimbal spring is fitted into a space defined by said peripheral wall as riding on said first surface.

5. The apparatus of claim 4 wherein said gimbal spring is generally rectangular in shape and said first magnetic head is fixedly mounted at the center of said spring.

6. The apparatus of claim 5 wherein said movable arm includes an additional gimbal spring supported to be deflectable by said movable arm and said second magnetic head is fixedly mounted on said additional gimbal spring.

7. The apparatus of claim 6 wherein said arm is provided with a pivot having its tip end in point contact with the back side of said additional gimbal spring at the center thereof.

8. The apparatus of claim 3 wherein said first and second surfaces are continuously formed by a common surface which slopes down from said first surface to said second surface.

9. The apparatus of claim 8 wherein said common surface is an inclined straight surface.

10. Apparatus for supporting a pair of magnetic heads to be in contact with opposite sides of a flexible recording medium, said apparatus comprising:

a stationary base provided with a head mounting section which includes a first surface and a second surface which is coplanar with said first surface;

a deflectable member having mounted thereon a first magnetic head to be in contact with a first side of said recording medium, said deflectable member being originally warped so that it is separated away from said second surface when supported on said first surface of said head mounting section without load;

a movable arm having a base end thereof pivotally supported to said base thereby allowing a free end thereof to move closer to or separated away from said first magnetic head, said movable arm including a a second magnetic head provided at said free end thereof to be in contact with a second side of said recording medium, said second side being an opposite side of said first side; and biasing means for biasing said movable arm to move said second magnetic head closer to said first magnetic head thereby holding said flexible recording medium in contact therebetween, whereby said deflectable member comes into contact with said second surface when said deflectable member is deflected thereby preventing said deflectable member from deflecting beyond a predetermined amount.

11. The apparatus of claim 10 wherein said deflectable member is a gimbal spring and said mounting section further includes a peripheral wall formed around the periphery of said first surface thereby defining a space for having said gimbal spring fitted therein as riding on said first surface.

12. The apparatus of claim 10 wherein said movable arm includes an additional gimbal spring suported to be deflectable by said movable arm and said second magnetic head is fixedly mounted on said additional gimbal spring.

* * * * *